United States Patent [19]
Pira

[11] 3,817,454
[45] June 18, 1974

[54] METHOD AND APPARATUS FOR SUBSURFACE AND DRIP IRRIGATION SYSTEMS

[76] Inventor: Edward S. Pira, 116 Rocky Hill Rd., Hadley, Mass. 01035

[22] Filed: Feb. 12, 1973

[21] Appl. No.: 331,556

[52] U.S. Cl. .................................. 239/76, 239/542
[51] Int. Cl. ........................................... B05b 15/00
[58] Field of Search ......... 239/76, 61, 170, 71, 159, 239/533, 340, 542

[56] References Cited
UNITED STATES PATENTS

| | | | |
|---|---|---|---|
| 2,019,922 | 11/1935 | McLellan | 239/542 X |
| 2,622,610 | 12/1952 | Rowe et al. | 239/76 UX |
| 3,080,885 | 3/1963 | Webster et al. | 239/76 X |
| 3,159,172 | 12/1964 | Baxter | 239/542 UX |
| 3,378,202 | 4/1968 | McKenzie | 239/76 |
| 3,502,098 | 3/1970 | Williams | 239/542 X |
| 3,518,831 | 7/1970 | Tibbals et al. | 239/542 X |
| 3,736,955 | 6/1973 | Schlesser | 239/542 X |

FOREIGN PATENTS OR APPLICATIONS
577,132    5/1946    Great Britain ...................... 239/76

Primary Examiner—Robert S. Ward, Jr.
Attorney, Agent, or Firm—Munroe H. Hamilton

[57] ABSTRACT

Fluid materials, particularly of the class employed in subsurface and drip irrigation systems, is supplied under relatively high pressures and conducted through a pressure-reduction stage during which discharge of multiple streams of the fluid takes place. The total volume of the fluid streams and the degree of pressure drop are controlled in relation to one another to reduce and maintain the flow rate of fluid supplied within a range of low velocity flow rates wherein friction losses are minimized to a point where pressure change of any appreciable nature is avoided and a substantially uniform release of fluid can be realized at all points along the irrigation system.

2 Claims, 9 Drawing Figures

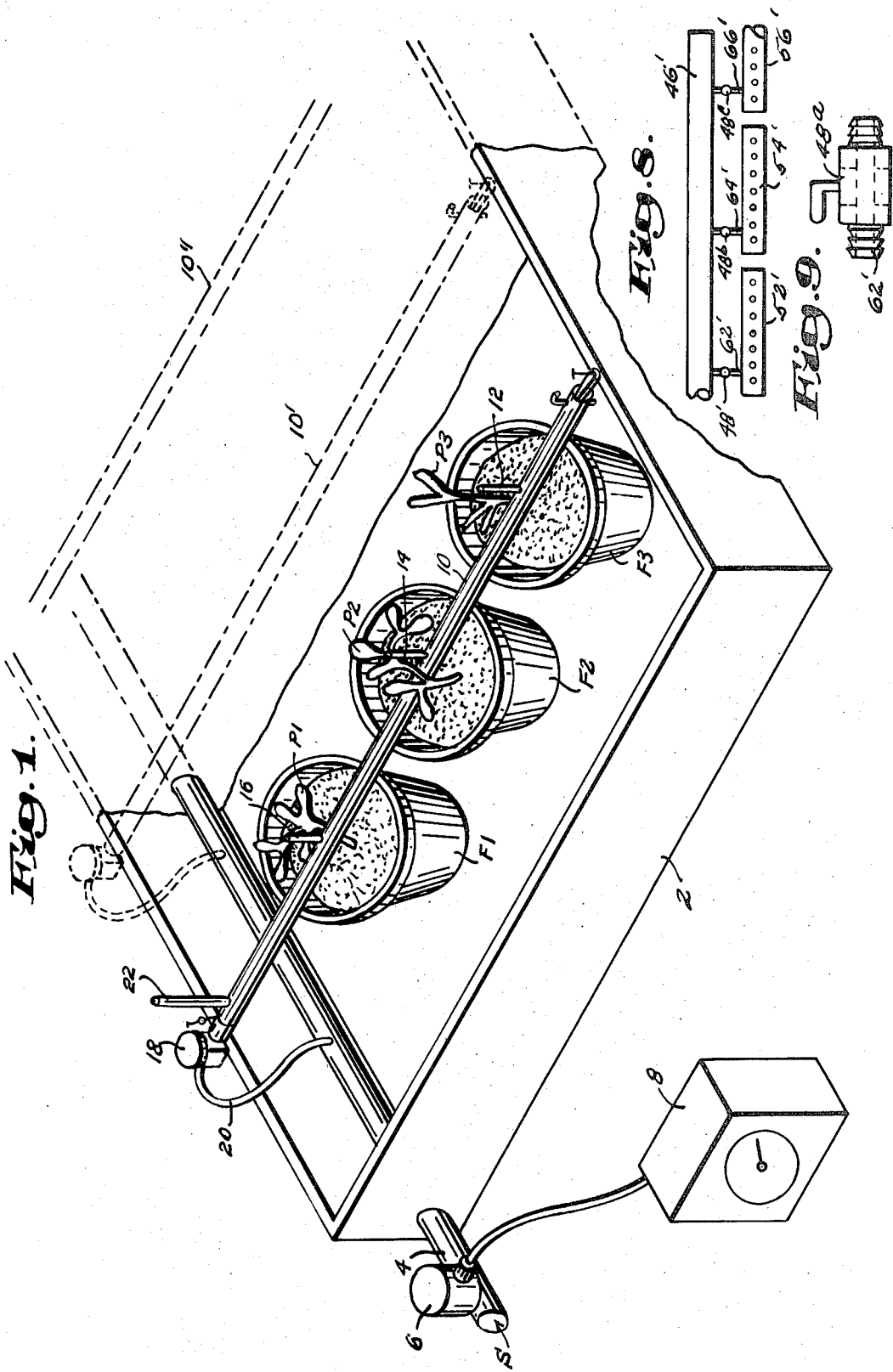

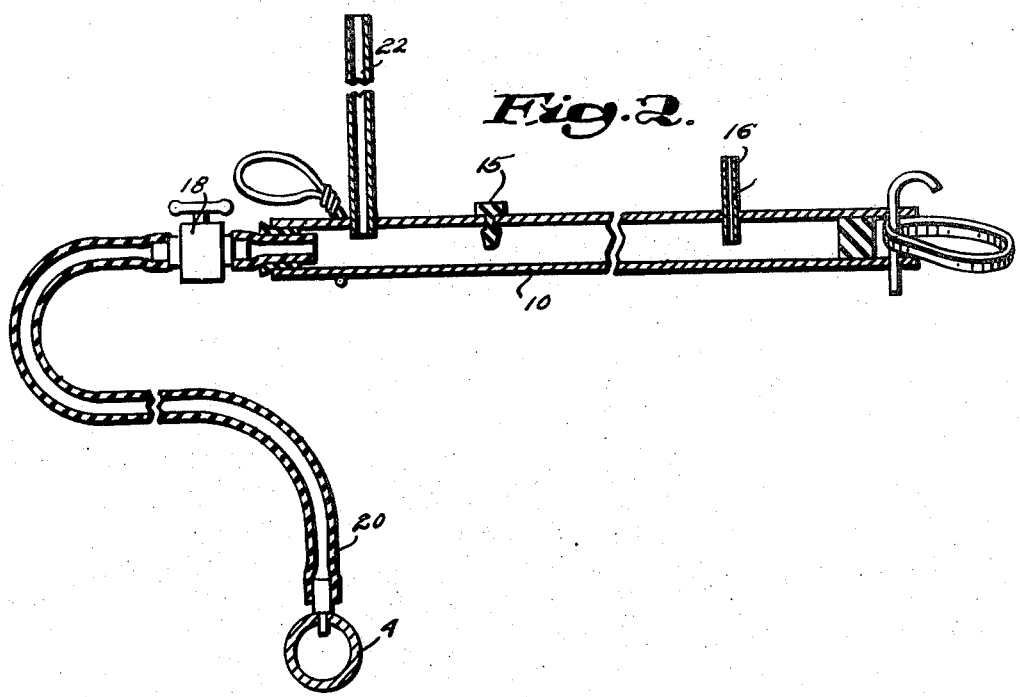
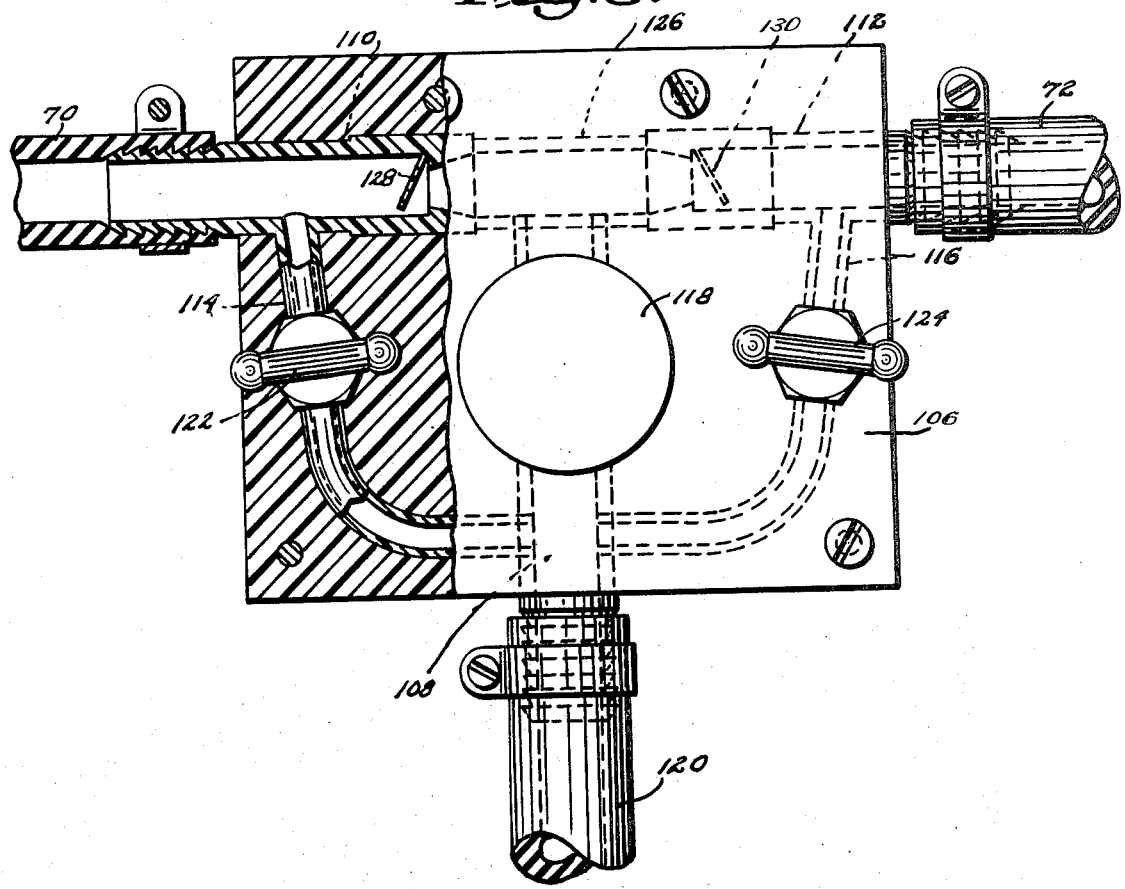

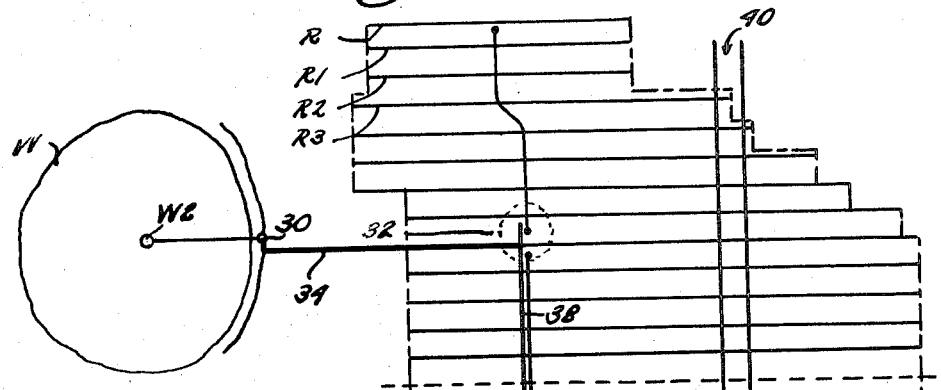
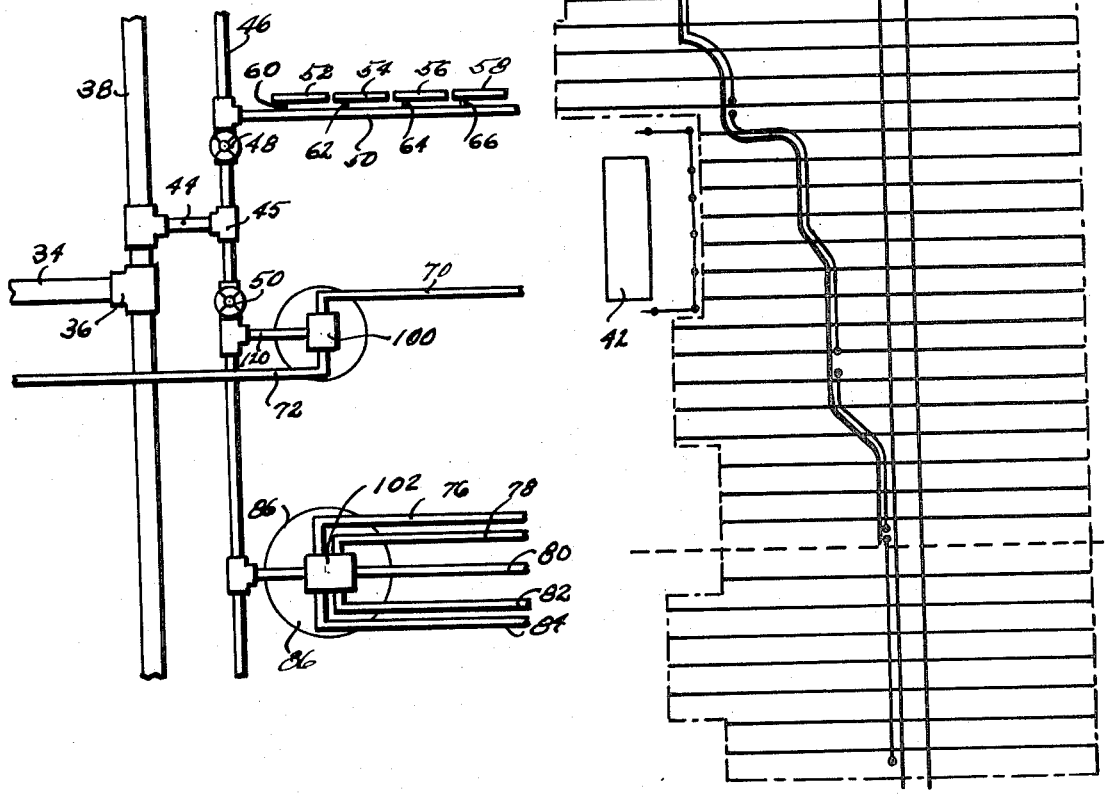

METHOD AND APPARATUS FOR SUBSURFACE AND DRIP IRRIGATION SYSTEMS

This invention relates to a method of supplying flow of pressurized fluid material through a conduit system wherein pressure change due to friction losses in the system is controlled. More particularly the invention is concerned with a method and apparatus for supplying a fluid material of the class employed in subsurface and drip irrigation systems and controlling the flow of such material to provide for release of substantially uniform volumes of material at each one of a multiplicity of outlet points along the system.

In supplying a flow of pressurized fluid through a conduit system to a number of discharge outlets, it is well known that friction losses may cause a drop in discharge rate varying with the distance at which the discharge outlets are placed away from the supply source.

In the case of subsurface and drip irrigation systems very substantial distances may be involved and a drop in discharge rate is encountered of a significant and troublesome nature resulting in non-uniform flow rates. To obtain uniform flow rates with high pressure systems of the type used in irrigation equipment, each of the discharge outlets must be individually designed or adjusted to compensate for variation in pressure and maintenance of high pressure can cause problems with joints and fittings resulting in hazards to the irrigated products or the possibility of soil erosion.

It will be understood that the operation of systems of the type described is based upon Bernoulli's flow equation such that with a constant head the dripper discharge rate is a function of the orifice size and thus the rate is fixed. To change the discharge rate, it is necessary to change the size or design of the dripper.

These problems may be complicated by the fact that installations in areas where there are elevational differences may necessitate varying the size and shape of the discharge outlets to a degree which is prohibitive in maintaining an efficient and useful irrigation system.

It is a chief object of the invention to deal with the problems indicated and to devise improved methods of supplying a flow of pressurized fluid to be used in subsurface and drip irrigation systems.

It is a specific object of the invention to devise a method and apparatus for supplying fluid material in a controlled manner such that a substantially uniform release of fluid material may be carried out at each one of a multiplicity of fluid outlets located at varying distances from a supply source.

Another object of the invention is to provide an improved apparatus for supplying and releasing controlled volumes of fluid along an irrigation system; and still another object of the invention is to devise apparatus of the class described in which means are included for carrying out a rapid fill of the entire irrigation system prior to the release of small volumes.

With the foregoing objectives and problems in mind, I have conceived of a method and apparatus for furnishing fluid material throughout an irrigation system in a manner such that discharge of substantially uniform volumes of fluid may be realized at a multiplicity of discharge outlets located at varying distances from a pressurized fluid source and occurring at elevational differences of a significant nature.

My improved method has originated from a study of friction head loss data derived from measuring and evaluating varying flow rates and chamber sizes of conduit members in which pressurized fluid is allowed to flow. This data was prepared in the form of friction head loss charts and tables. Analysis of friction head loss data, thus obtained, has led to a determination of certain basic relationships which can be realized in a fluid flow system where a pressure drop occurs, and from this determination, there has been conceived a method and means of controlling the degree of pressure drop in relation to total volume of fluid being released from the system at a multiplicity of fluid outlets so as to reduce and maintain the flow rate of fluid supplied within a range of low velocity flow rates wherein friction losses are held to values such that pressure changes of any appreciable nature are avoided and as a consequence, uniform release of fluid can be realized at all of the fluid outlets.

In this connection, an important fact which has been determined is that friction head or pressure loss due to friction is low when the fluid flow rate is low in relation to pipe size. The term "chamber body," as hereinafter employed in the specification is used to mean an oversized fluid enclosure or pipe which is generally of a size much larger than would be conventionally considered necessary to conduct a low volume of water. The term "chamber method" of subsurface and drip irrigation is also employed in the specification to denote a method of controlling flow of fluid in which head pressure is held substantially uniform throughout all portions of a fluid-containing chamber body, and uniform discharge rates from the chamber body regardless of location therealong are realized.

It will be appreciated that this uniform discharge rate is also governed by Bernoulli's flow equation. However, unlike conventional systems, in the chamber method, the drip or conduit outlet size may be held constant while the head or pressure may be changed to regulate the fluid discharge rates from the fluid outlets with uniformity still being achieved. It is also found that if different pressures are applied to individual chamber bodies, there may be realized compensation in changes in elevation and varying pressure requirements encountered in some working areas. Also, if the volume of flow is low in relation to the chamber body size, it is possible to conduct water over greater distances than is conventionally carried out.

The nature of the invention and its other objects and novel features will be more fully understood and appreciated from the following description of a preferred embodiment of the invention selected for purposes of illustration and shown in the accompanying drawings, in which:

FIG. 1 is a perspective view illustrating one form of irrigation system in which the method and apparatus of the invention may be employed utilizing a relatively high pressure source of supply of fluid material;

FIG. 2 is a detailed cross sectional view of portions of the apparatus shown in FIG. 1;

FIG. 3 is a fragmentary plan view of pressure reduction means of the invention;

FIG. 4 is a diagrammatic view illustrating a typical irrigation system arranged to operate in accordance with the invention method;

FIG. 5 is a detail plan view of conduit and control valve means;

FIG. 8 illustrates diagrammatically a short length drip unit arrangement with valve controls;

FIG. 9 is a detail elevational view of one of the valve controls indicated in FIG. 8.

Figure 6:
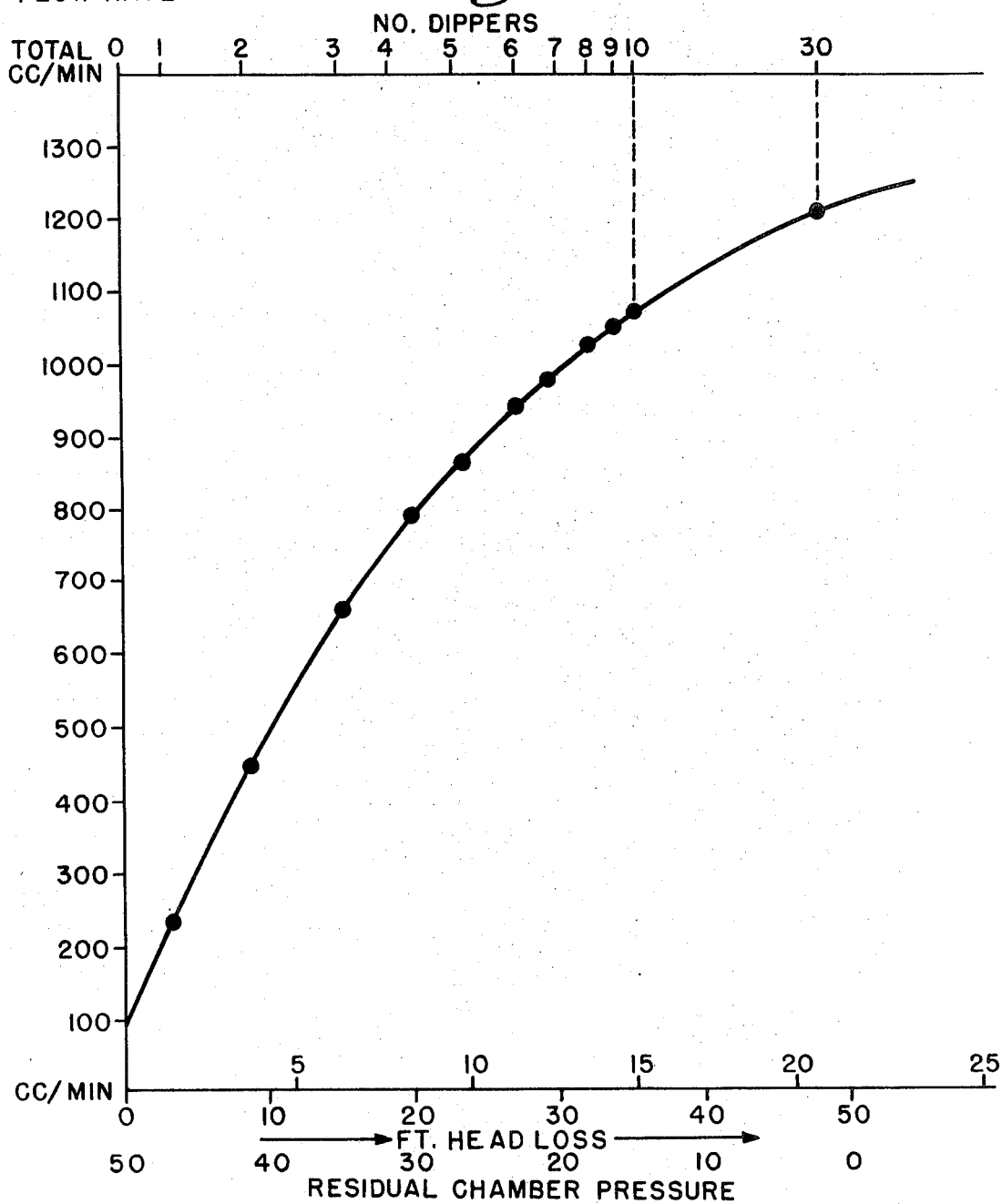
FIGS. 6 and 7 are diagrammatic views illustrating pressure reduction curve data and pressure control means.

In accordance with the invention, therefore, I have devised a method and means for furnishing fluid material to an irrigation system in which a source of pressurized fluid material is provided and released from a fluid conducting chamber body of predetermined size. The high pressure fluid is conducted into the chamber body through a pressure-reducing stage and simultaneously a plurality of fluid streams are released through discharge outlets located at separated points along the chamber body. The degree of pressure reduction is controlled in relation to the total volume of the fluid stream required to be released and simultaneously the flow rate of fluid moving through the chamber body is reduced to, and maintained, within a narrow range of relatively low velocity flow rate values wherein friction head losses are substantially avoided with the result that very uniform discharge of fluid is realized at each of the discharge outlets. I find that by increasing the size of the chamber, the number of discharge outlets may be increased without loss of uniformity of flow.

Since my improved chamber method, in order to perform satisfactorily, requires that the chamber body be fully charged with fluid and a predetermined adjusted operating pressure be established, a considerable time difference may develop in filling an irrigation system of relatively short length as compared with a system of relatively long length.

With this in mind, I have further provided for carrying out a rapid filling of chambers of relatively long length. This is accomplished by allowing fluid to flow directly into the chamber body from a high pressure water supply in order to charge the system before reverting to an adjusted operating pressure.

In the drawings, FIG. 1 illustrates diagrammatically a typical irrigation system of relatively short length such as may be employed in a greenhouse or similar operation and in which my chamber method may be carried out. FIG. 2 illustrates further detailed portions of fluid-control apparatus shown in FIG. 1.

Figure 7:
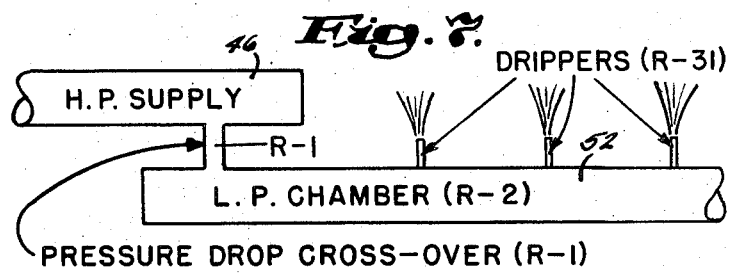

An irrigation system of relatively long length, together with fluid-control apparatus of the invention, is illustrated diagrammatically in FIG. 4, and, in more detail, in FIGS. 3, 5 and 7.

Considering in greater detail the structure shown in FIGS. 1 and 2, numeral 2 denotes a typical greenhouse bench arrangement in which plants P1, P2 and P3 are being grown in respective flower pots F1, F2 and F3. As is customary in watering plants on a greenhouse bench, a source of high pressure water S supplies a pressure of from 5.0 p.s.i. to 50.0 p.s.i., and this flow through the conduit 4 is controlled in some suitable manner as, for example, by means of a solenoid regulated valve 6 which may, in turn, be under the control of a time clock 8. Numerals 10, 10' and 10'' denote feed pipes which are designed to be adjustably supported transversely across the bench member 2 in a position above the tops of the flower pots F1, F2 and F3. Located along the feed pipe 10, for example, I provide fluid discharge outlets or "drippers" as 12, 14, 16, etc.

In accordance with the invention, water from the conduit 4 is subjected to a pressure reduction stage by conducting the water through an adjustable pressure-reducing valve 18 which is connected to conduit 4 by a pipe 20. Numeral 22 denotes a pressure head tube for indicating variation in pressure. Water delivered from the pressure-reduced stage passes through the feed pipe 10 and provides for a flow simultaneously of small quantities of water from the drippers 12, 14 and 16. Utilizing the chamber method of the invention, the adjusted pressure is controlled with reference to the total number of drippers in operation, and this pressure, together with the total volume of fluid released through the drippers is regulated to maintain in the pipe 10 a low velocity flow rate at which friction head losses are substantially avoided.

As illustrative of a typical system for irrigating potted plants in a greenhouse, there may be cited a supply pressure in the conduit 4 of 20 p.s.i. This pressure was reduced by the adjustable valve 18 to a pressure of 0.11 p.s.i. in each of the feed pipes 10, 10', and 10''. Each feed pipe involved twelve 0.020 inch diameter drippers, as noted by numerals 15 and 16 in FIG. 2 (one for each pot in the row across the bench). The flow rate in each of the feed pipes was controlled and maintained at approximately 0.05 gallons per minute and approximately 0.004 g.p.m. per dripper.

This system was cycled to automatically turn on by a time clock controller, 8, in FIG. 1 and was allowed to operate 30 minutes every 24 hours. The duration of time the system operated was eight weeks. During this period, the water flow from each dripper maintained a substantially uniform rate.

It should be understood that the number of drippers in the feed pipes can be increased or decreased in accordance to the width of the bench and the physical size of the pots used, peculiar to the greenhouse operation.

The watering cycle and length of watering time can be readily altered by the greenhouse operator's experience and good judgment. The irrigation requirements will vary with the species of plant, the stage of maturity, the volume and water holding capacity of the soil mixture used.

In a greenhouse installation of the character described where it was desired to increase the number of drippers being furnished from any one of the feed pipes 10, 10', 40'', it was found that by replacing these feed pipes with similar feed pipes of larger size, a continued uniform discharge could be realized with the same adjusted pressure setting. In this type of arrangement, little difficulty was experienced in filling the system without a time delay.

As further illustrative of a typical chamber method of subsurface and drip irrigation, I have illustrated diagrammatically in FIG. 4 an apple orchard consisting of roughly seven and a half acres of hilly land with 1350 two-year old apple trees being planted in this ground and being spaced about ten feet apart along a row and the rows being spaced apart about twenty feet. In this particular irrigation system described, the supply of water was designed to feed through one dripper element 16, (FIG. 2), (0.032 inch × ¾ inch brass tube) per tree with provisions for expanding to three drippers as the trees grew larger. The water discharge rate required to be supplied for satisfactory irrigation purposes was specified at 0.03 gallons per minute or 1.8 gallons per hour per tree.

As indicated in FIG. 4, apparatus is shown arranged to furnish the required quantities of water in accordance with the chamber method of the invention. Included in FIG. 4 is a water supply consisting of a pond W from which water is drawn through a screen W1 by a pump 30 and delivered to a feed station generally indicated by the circled area 32.

FIG. 5 illustrates in larger scale the various components which are localized at the feed station 32. As shown in FIG. 5, a conduit member 34, for example, a two-inch mainline pipe receives high pressure water from the pump 30 and delivers it through a suitable tee 36 to a high pressure supply line 38. The supply line 38, carrying water under a pressure of from 30 p.s.i. near source to 5.0 p.s.i. at highest elevation in the field (i.e. 25' to 30'), is arranged to extend transversely across the rows of trees R, R1, R2, R3, etc. as shown in FIG. 4 in substantially parallel relationship to a roadway 20 located through the orchard. 44 indicates a barn arranged centrally of the orchard and the subsurface irrigation system described.

As further indicated in FIG. 5, water from the two-inch main 38 is furnished through connections 44 and tee 45 to a one-inch pipe 46 designed to carry water at a pressure of a desired magnitude. Supply and gate valves as 48 and 50 provide for selective control of flow along desired sections of line 46. It will be understood that water is drawn off from pipe 46 in varying amounts and at varying points in order to irrigate trees in different areas in the orchard with the trees occurring in different groupings and numbers. For example, the pipe 52 may be connected to pipe 46 and will supply water along its length at a pressure of 2½ p.s.i.

In accordance with the invention, a series of drip units as 52, 54, 56 and 58 are connected by adjustable pressure reducing connectors (FIG. 8) to a high pressure water supply pipeline 50. For sections of the field having relatively steep grades or slopes, the high pressure feed pipeline is extended along the row.

The drip units were reduced in length to allow about 1 percent to 2 percent slope equivalency. That is, for rows having slopes of 4 percent, the drip units were limited from 25 to 50 feet. The drip units were constructed of one-half I.D. Polyethelene plastic pipes that were sealed at each end.

All of these dripper units, as shown, are designed with a number of water discharge outlets totaling 3 to 5 in number and the total volume of water from each outlet amounts to 1.8 gallons per hour. The outlets are comprised of 0.32 × ¾ inch brass tubes extending through the walled sections of the units. The pipe 50, together with its crossover pressure-reducing connectors and respective short lengths of dripper units 52, 54, 56, 58 thus constitute an irrigation system suitable for supplying the required amount of water earlier indicated to service 1350 two-year old trees. In this illustrative installation, the pressure of water supplied was 30 to 5 p.s.i. and the pressure of water after passing through the adjustable connector crossovers into the dripper sections was reduced to a value of approximately 2½ p.s.i.

The pressure noted, adjusted in accordance with the chamber method of the invention and having regard for the total volume of water leaving the dripper sections, was found to provide a flow rate which resulted in substantially no friction head loss being present in the system and a uniform discharge rate was obtained at all of the outlets in the drippers.

As shown in FIG. 5, a similar arrangement was utilized to irrigate other relatively flat sections of the orchard involving longer feed pipes as suggested at 70 and 72 and extending in opposite directions from one another. These feed pipes are selectively controlled by the valve 50. Likewise, still other groups of feeder pipes may be connected as shown in FIG. 5 and as denoted by the pipes 76, 78, 80, 82 and 84, under control of a valve 86.

In all of these dripper sections, the chamber method was employed to carry out a pressure-reduction control in accordance with the total volume of water discharged while simultaneously a flow rate was maintained at a sufficiently low velocity to avoid any appreciably significant friction head loss at any point along the entire line.

As has been earlier noted, in a subsurface irrigation system of the size described above, the chamber method operation is dependent upon the entire system having been completely filled. To accomplish this at the low pressure and low flow velocity rates indicated would be impractical and to avoid this difficulty I have provided in combination with the low pressure system described a rapid-fill means indicated in the drawings in FIG. 5 at 100 and 102 and shown more in detail in FIG. 3.

As suggested in the latter FIGURE, numeral 106 denotes a valve block which is formed with a fluid inlet port 108 and fluid outlet ports as 110 and 112 which are connected to inlet port 100 by respective passageways 114 and 116. A valve member 118 may, if desired, be solenoid controlled to open and close the inlet port 108 to regulate flow of fluid entering the block through a conduit 120. Connected to the outlet ports 110 and 112 are respective conduits 70 and 72. The passageways 114 and 116 are selectively adjusted to regulate the reduced operating pressure by valves as 122 and 124. Between the outlet ports 110 and 112 is a common passageway 126 having at opposite ends thereof flapper valves as 128 and 130.

In operation, when a rapid filling of the system is desired, valve 118 is opened. This allows high pressure fluid to pass through inlet 108 and then pass the flapper valves 128 and 130 out of the outlet ports 110 to 112 to rapidly fill at high pressure all sections of the chamber body comprised by all of the pipe sections and the supply pipes. As soon as the system is filled, valve 118 is closed and fluid then is passed through the smaller passageways 114 and 116 and leave the pipes 70 and 72 at a desired reduced pressure which has been pre-regulated in accordance with the dripper and flow rate requirements already disclosed. Valves 122 and 124 remain open at all times.

The volume of liquid discharged from a given diameter and type of outlet or dripper is a function of its resistance to flow and the residual pressure in the chamber.

FIG. 6 depicts a typical curve showing the relationships of total volume of discharge (cc per min.), pressure drop through cross-over conduit means, residual pressure in the chamber as the number of drippers added to the chamber increases from 1 to 30. This curve was plotted from test data using the cross-over method shown diagrammatically in FIG. 7.

As an example, a non-adjustable cross-over tube R–1 (0.064 inch × 1.0 brass tube) was inserted between a high pressure liquid supply 46 (21.65 p.s.i. or 50′ water gauge) and a low pressure distribution chamber 52.

With no elevation differences and no drippers, the pressure will equalize throughout the system and the supply pressure will equal chamber pressure. As drippers are added to the chamber, the total resistance ($R_3$) is lowered, increasing the flow rate. The pressure drop through the cross-over ($R_1$) increases. The residual pressure in the chamber decreases.

The decrease of residual pressure and the discharge rate per dripper will decrease rapidly as the first few drippers are added but will diminish and tend to level off as more drippers are added and as the cross-over ($R_1$) begins to limit flow rate.

Since the residual pressure and dripper discharge rate are interdependent, the increase of total flow is relatively small which causes the energy loss through the cross-over ($R_1$) to increase slightly. With the addition of each dripper, the effect upon chamber pressure becomes less, as illustrated by the typical curve in FIG. 6. The approximate discharge rate per dripper can be obtained by dividing the total flow by the number of drippers found for a given point along the curve.

Further, tests showed that the slope of the curve varied with: (1) change of supply pressure, (2) the type and size of cross-over, (3) the type, size, and length of chamber, (4) the type, size and spacing of outlets, and (5) elevation differences. Due to these variables the use of a non-adjustable cross-over tube would not be practical for drip and subsurface irrigation systems.

In my improved method, the adjustable cross-overs or conduits, as illustrated in FIGS. 8 and 9, offer a considerable advantage over the previously described tube type. As shown in FIGS. 8 and 9, high pressure pipe 46′ is provided with cross-over pipes as 62′, 64′, 66′ connecting with short lengths of drip units 52′, 54′, 56′, and each cross-over pipe is fitted with valve elements 48a, 48b and 48c, better shown in FIG. 9. After the field installation has been completed and the chambers charged with water, the adjustable cross-over provides a rapid means of regulating the rate of water discharge from each individual chamber in the system. The rates can be varied at will to meet the existing field conditions.

Subsurface Irrigation Systems. The chamber method disclosed applies to subsurface installations as well as surface systems, but there are some additional considerations.

It is conceivable that the external dripper clogging problem in subsurface systems occurs when the water drains from the chamber after the system is shut off. A vacuum could be created which could "suck" the soil particles into the dripper orifices causing them to become plugged. With the chamber method, a very low positive pressure can be maintained in the chamber at all times between irrigation periods. The dripper discharge rate at this reduced pressure would be negligible. Also, during the initial quick-fill period, a surge of high pressure water can be applied to the chamber which could flush the drippers.

I claim:

1. That improved method of furnishing fluid material to an irrigation system which comprises providing a source of fluid material at a predetermined relatively high pressure, conducting the high pressure fluid into a chamber body of a length extending away from the source for a substantial distance through which friction losses incurred along the chamber body are operative to cause a variation to said pressure, reducing the pressure of the fluid as it passes through the chamber body, simultaneously releasing a plurality of streams of fluid through discharge outlets communicating with the chamber body, controlling the said predetermined pressure, the degree of pressure reduction and the total volume of the fluid streams released in relation to one another to reduce and maintain the rate of flow of fluid throughout the chamber body at a value at which no friction head losses are induced at any point along the said length of the chamber body.

2. Apparatus for supplying fluid material to an irrigation system comprising means for furnishing a high pressure fluid, a chamber body, conduit means for conducting selected quantities of said fluid material into the chamber body, a plurality of fluid outlets communicating with the chamber body, valve means for controlling the pressure of fluid passing into the chamber body in accordance with the volume of fluid leaving the chamber body through the fluid outlets, said means for furnishing high pressure fluid including pump means and valve block means connected to the pump means, said valve block means being formed with an inlet port for receiving said high pressure fluid, said valve block means also being formed with fluid outlet port means at either side of the valve block and communicating with the fluid inlet port along a common passageway portion, flapper valve means operable to close and isolate the common passageway, and bypass passageways connecting with the fluid outlet port means externally of the flapper valve means.

* * * * *